Feb. 2, 1965     W. G. ROLLINS     3,167,809
ELECTRICAL STUNNING DEVICE
Filed July 26, 1963     3 Sheets-Sheet 1
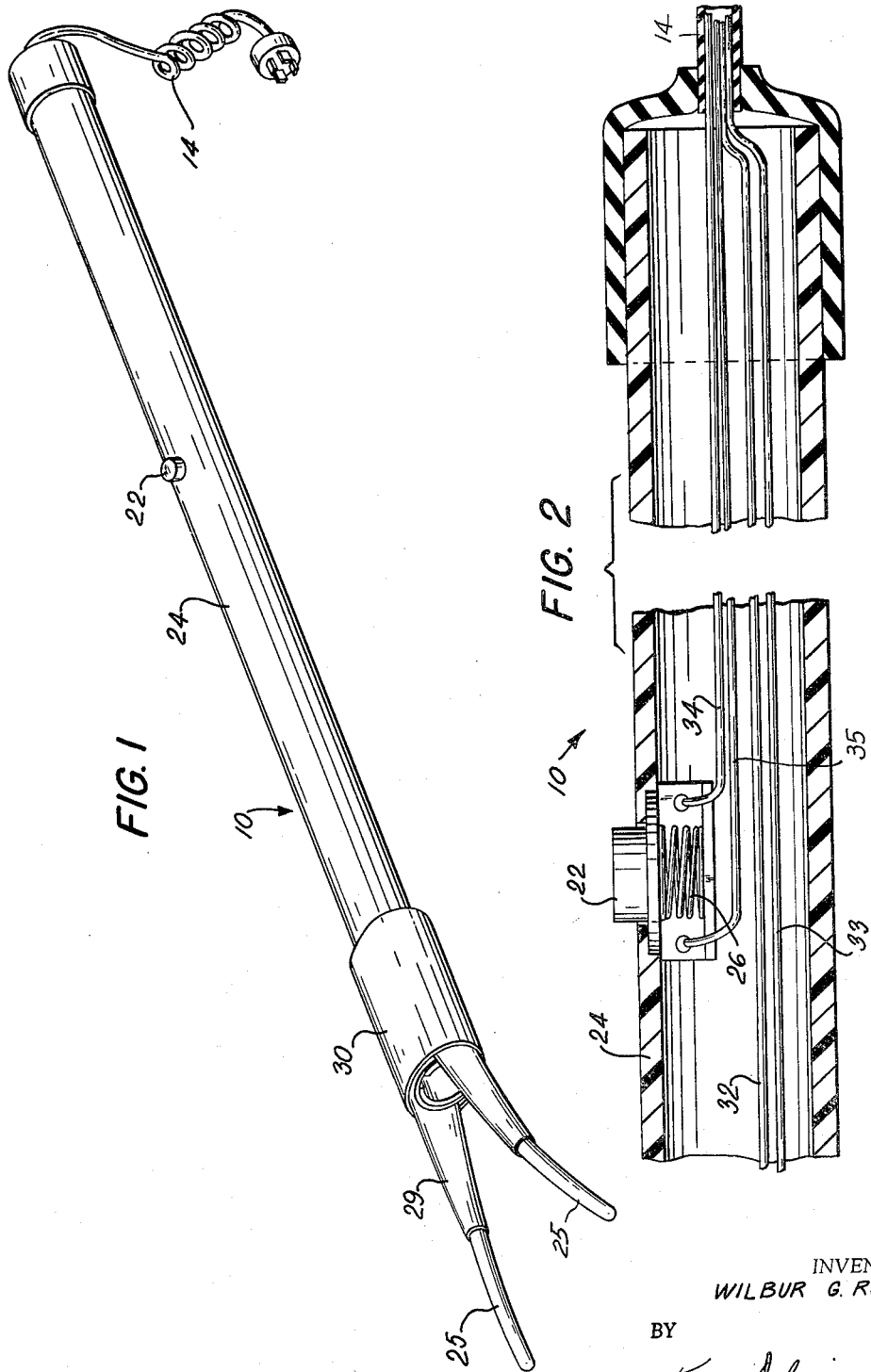
INVENTOR.
WILBUR G. ROLLINS
BY
Kane, Dalsimer and Kane
ATTORNEYS

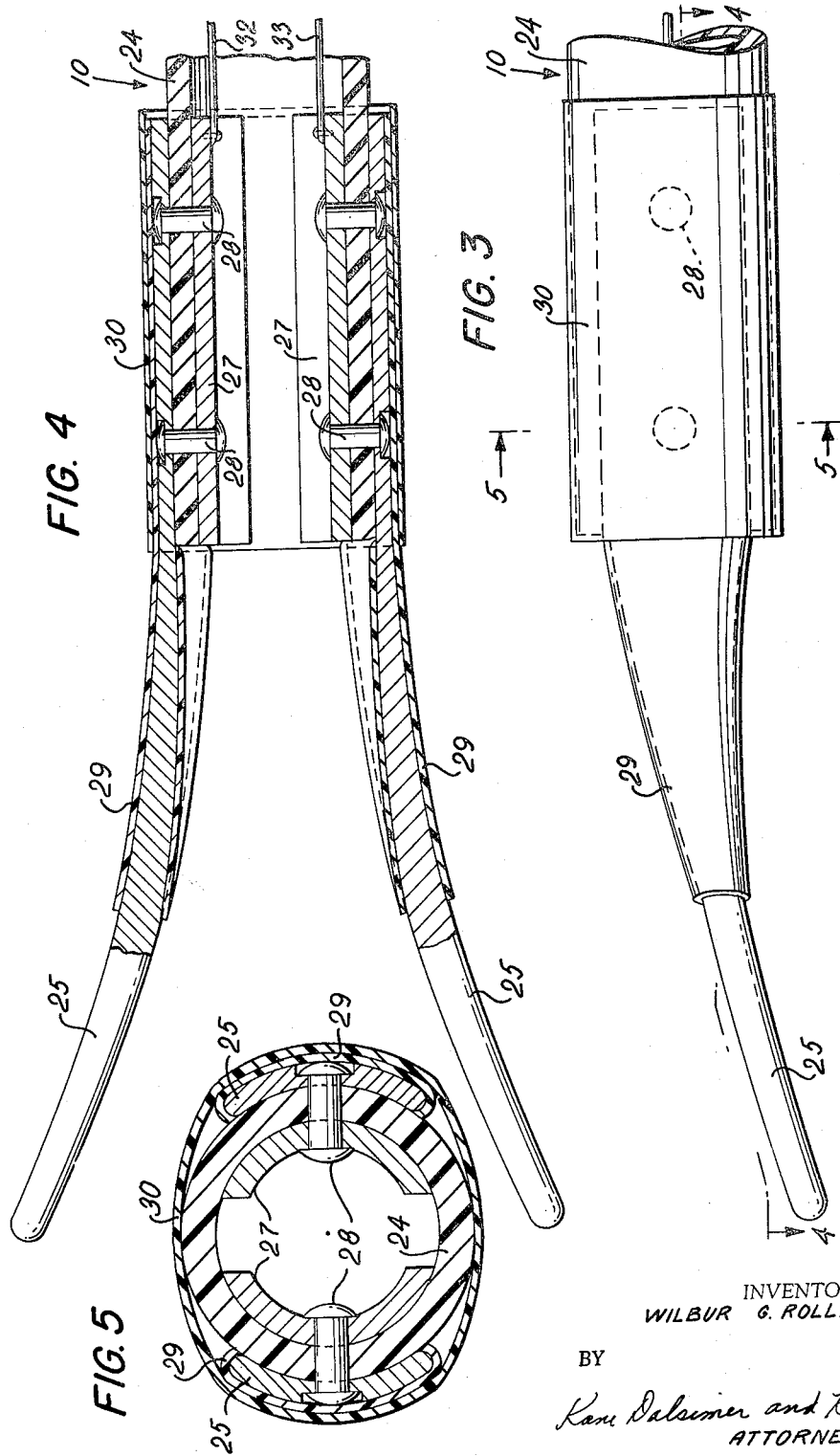

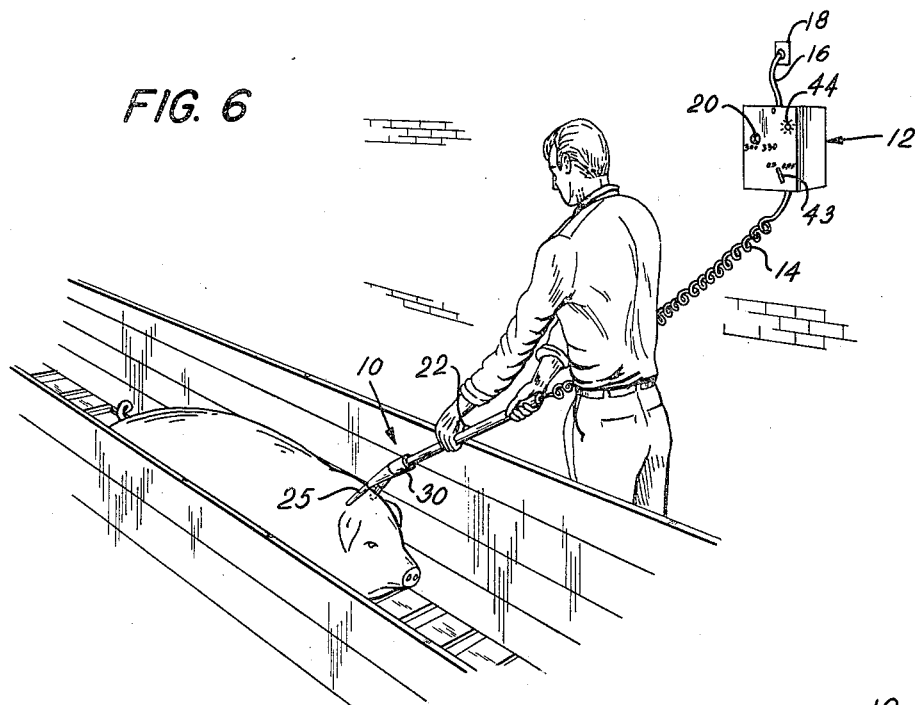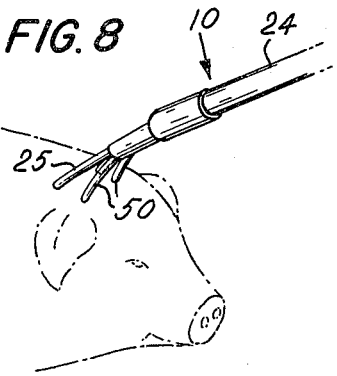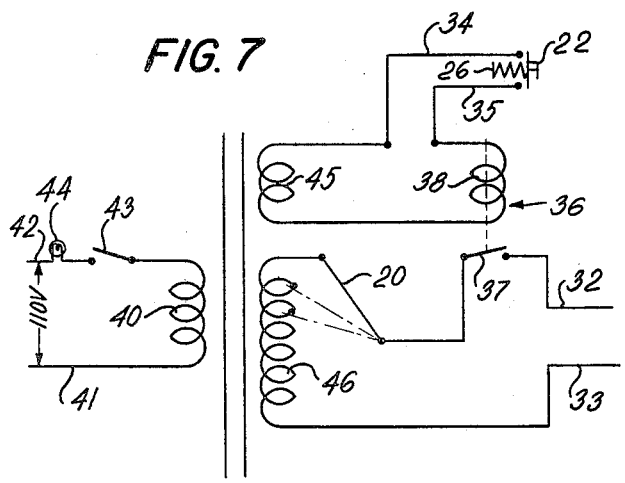

United States Patent Office 3,167,809
Patented Feb. 2, 1965

3,167,809
ELECTRICAL STUNNING DEVICE
Wilbur G. Rollins, Rochester, N.Y., assignor to Tobin Packing Co., Inc., Rochester, N.Y., a corporation of Delaware
Filed July 26, 1963, Ser. No. 297,907
2 Claims. (Cl. 17—1)

This invention relates to an improved electrical stunning device for stunning an animal prior to slaughtering.

In the humane slaughtering of animals, the animal is stunned prior to bleeding or slaughtering. Electrical stunning has been one procedure followed in connection with animals such as hogs. Generally speaking, electrical stunning of hogs has been quite satisfactory. However, problems have arisen with regard to the specific equipment used in following this procedure.

Thus, certain of the devices used in electrical stunning of animals have been complicated, clumsy and difficult to manipulate. This slows down the operation of stunning, produces uncertain results with incomplete or only partial stunning of the animal at times, and not infrequently results in muscle spasms in the animal. Also, some of the electrical stunning devices heretofore available have been unsafe or hazardous to use in that the operator would sometimes be subjected to a relatively high voltage electrical shock.

It is an object of the present invention to overcome the difficulties and disadvantages heretofore encountered and to provide an improved electrical stunning device for the stunning of animals prior to slaughtering which is of relatively simple and inexpensive construction; which is light in weight and small in size so that it is easy to manipulate; and which has improved electrical circuitry so as to eliminate or minimize the danger of subjecting the operator to high voltage electrical shocks.

A further object is the provision of an electrical stunning device of improved construction so that the electrodes for applying electrical voltages to the animal's head are normally deenergized and only become energized when the device is manipulated and the operator exerts force or pressure thereon while applying the electrodes to the animal's head.

My invention contemplates the provision of an electrical stunning device in the form of an elongated, tubular handle made of a dielectric material and having diverging electrodes extending from one end thereof for application to the head of the animal to be stunned. A normally open spring biased control switch is provided on the back surface of the handle in the intermediate gripping area so that when the operator exerts force or pressure thereon in applying the electrodes to the head of the animal the switch will be closed so as to energize the electrodes. The electrodes are connected in a relatively high voltage electrical circuit. On the other hand, the control switch is in a relatively low voltage circuit and controls a relay which operates a switch for energizing the electrodes.

In the accompanying drawings:

FIG. 1 is a perspective view of an electrical stunning device embodying my invention;

FIG. 2 is a broken view in section, on an enlarged scale, showing the upper and intermediate portions of the handle of the stunning device together with the operating switch and its electrical connectors;

FIG. 3 is a detailed elevational view of the end portion of the stunning device showing the electrodes;

FIG. 4 is a detailed sectional view of the end portion of the stunning device in the direction of the arrows on the line 4—4 of FIG. 3;

FIG. 5 is a cross-sectional view in the direction of the arrows on the line 5—5 of FIG. 3;

FIG. 6 is a perspective view showing the stunning device connected to an electrical control box and about to be used in the stunning of a hog;

FIG. 7 is a diagrammatic view showing one form of circuitry that may be used in my stunning device and control box; and FIG. 8 is a perspective view of the end portion of a modified type of stunning device showing it in use and showing different forms of electrodes.

Referring to the drawings, my improved stunning device is shown generally at 10 and is connected to a control box 12 by means of a retractable cord 14. The control box in turn is connected by a lead 16 to an electric power supply, such as 110 volt, 60 cycle current through outlet 18.

As will be later described in greater detail, the voltages supplied to the electrodes of the stunning device by the control box may be varied by means of the voltage regulator 20. Also, through the control box, a control switch 22 on the stunning device connected in a low voltage electrical circuit serves to energize the electrodes with high voltage current.

My improved stunning device 10 comprises a relatively elongated tubular handle 24 made of a light-weight, strong, relatively rigid, dielectric material such as polyvinyl chloride, polyethylene, polypropylene or a synthetic rubber. The length of the handle may vary. I have found that a convenient handle may be formed from a tubular, cylindrical rod approximately 24" to 30" in length.

The tubular handle has a first end portion which serves as a gripping area which may be gripped by one hand of the operator, as shown in FIG. 6. It also has a second end portion to which the electrodes 25 are secured. Intermediate the ends of the tubular handle is a second gripping area which is gripped by the second hand of the operator, also as shown in FIG. 6. The spring biased control switch 22 is mounted on the rear face of this second intermediate gripping area. As shown in FIG. 2, control switch 22 is normally biased to open position by spring 26. When the operator grasps the handle in his two hands and then manipulates the handle to apply the electrodes to the head of the hog or other animal he exerts force against the switch in the intermediate gripping area, thereby closing the switch and energizing the electrodes. When this force is released, the switch automatically opens and the electrodes are deenergized.

The electrodes are made of a suitable electrically conducting metal, such as copper, brass, aluminum, aluminum alloy, or steel. As shown most clearly in FIG. 4, they are mounted on the outer surfaces of diametrically opposite sides of the lower or second end of the handle. They are formed with prongs which diverge outwardly from the lower end of the handle, as shown most clearly in FIG. 4, and they preferably are curved or bent toward the front face of the stunning device, as shown most clearly in FIG. 3. The electrodes are held in place by conductor plates 27 mounted on the inner surfaces of the lower end of the handle on diametrically opposite sides and connected to the electrodes by means of rivets 28 which extend through the electrodes and conductor plates, and through the side wall of the handle. The conductor plates and rivets are also made of an electrically conductive metal similar to that from which the electrodes are made. Thus, current applied to the conductor plates 27 will pass through the rivets to the electrodes 25. The upper portions of the electrodes 25 are encased in a wrapping 29 of flexible insulating material, such as rubber, synthetic rubber, polyvinyl chloride, polyethylene, or the like. The lower end of the handle and the portions of the electrodes mounted on the handle are encased in an outer wrapping or sheath 30 of similar insulating material.

Electrical leads or wires 32 and 33 are connected at their lower ends to terminals on the conductor plates 27 and extend longitudinally through the tubular handle to the upper or first end where they extend outwardly as two of the conductors of the four-conductor retractable cord 14.

As shown most clearly in FIG. 2, and in circuit diagram FIG. 7, the two terminals of push-button control switch 22 are connected to leads 34 and 35 which extend through the tubular handle from the switch to the first or upper end of the handle where they extend outwardly as the other two conductors of four-conductor retractable cord 14.

As previously indicated, the leads 34 and 35 of control switch 22 are connected in a relatively low voltage circuit, less than approximately 10 volts, preferably approximately 6 volts. In series in the same circuit is a relay indicated generally in the circuit diagram FIG. 7 by the numeral 36, which when energized serves to close relay switch 37 which is in series with the circuit of high voltage leads 32 and 33. The switch 37 is normally open, however, when control switch 22 is closed it actuates relay 36 closing switch 37 so as to energize electrodes 25 through leads 32 and 33.

As shown in FIG. 7, the relay is of the usual electromagnetic type having coil 38 disposed in series with switch 22.

The electrical energy applied across the electrodes 25 may vary with the size of the animal and the length of time that the electrodes are applied to the animal's head. The current should be adequate so that the animal will be stunned when the electrodes are applied for a period of time, no more than approximately 5 seconds. I have found that satisfactory results are achieved in a 50 watt output with voltages between approximately 250 and 500 volts, where the electrodes are applied to the head of a hog adjacent the base of the ears for a period of approximately 3 seconds. In the case of a relatively small hog of approximately 200 lbs. I prefer to apply approximately 280 volts across the electrodes for a period of 3 seconds with a 50 watt output. For a medium size hog of approximately 300 lbs. I prefer to apply approximately 340 volts. For a large size hog of over 400 lbs. I prefer to apply approximately 400 volts.

The electrical output may be supplied from separate electric power sources. However, I have found that the two voltages may be conveniently derived through two separate secondary windings or coils of the same transformer, in which the primary 40 is connected by leads 41 and 42 extending through cord 16 to a receptacle 18 connected to the usual electrical power supply of 110 volts, 60 cycles, as shown most clearly in FIGS. 6 and 7. The transformer is located in control box 12, and a switch 43 is preferably provided in the power line in series with primary coil 40. An indicator light 44 may also be connected in series with switch 43 so as to show when the switch is closed.

As previously indicated, the transformer preferably has two secondary windings or coils, one relatively small winding 45 with an output of approximately 6 volts, and one relatively large winding or coil with an output of approximately 400 volts.

The small winding 45 is connected through two of the conductors of retractable cord 14 to leads 34 and 35 which are connected to the terminals of control switch 22. The electromagnetic winding 38 of relay 36 is connected in series with this circuit. Thus, when control switch 22 is closed, the relay is actuated to close switch 37 of the high voltage circuit.

Variable voltage control switch 20 on the control box 12 is connected in series with the output of the relatively large secondary winding 46, as shown in the circuit diagram FIG. 7. A plurality of taps are provided on the secondary winding 46 so that different voltages may be obtained. In the illustrated embodiment, I have shown three taps giving voltages respectively of 400 volts, 340 volts, and 280 volts. Variable voltage control switch 20, relay switch 37 and leads 32 and 33 are connected in series with secondary winding 46. Thus, when the relay switch is closed, the two electrodes 25 will be energized with the high voltage current.

In using my improved stunning device, cord 16 of control box 12 is connected to the source of electric power through receptacle 18. Retractable cord 14 of the stunning device is then connected to the output of the control box. Switch 43 is then closed and indicating light 44 will light to show that the control box is energized. The variable voltage control switch 20 is then turned to the proper position to give the desired voltage output. The operator then grasps the first or upper end portion of the handle in his one hand and grips the intermediate portion of the handle in his other hand, as indicated in FIG. 6, and arranges the device so that the prongs bend downwardly towards the hog or other animal to be stunned. When the hog is in the proper position, he tightly grips the intermediate portion of the handle and presses the handle downwardly so as to apply the two prongs of the electrodes to the head adjacent the base of the ears. In thus gripping the intermediate portion of the handle and applying the electrodes against the head of the animal, the operator exerts pressure with the inside of his hand against the spring biased control switch 22 so as to close it, thereby activating the relay and energizing the electrodes. He continues to apply pressure or force in this fashion for approximately 3 seconds, and the animal is then stunned. The animal will remain in stunned condition for several minutes so as to permit the subsequent operations of suspending the animal by his rear legs and bleeding him by cutting the jugular vein.

The animal is preferably led to the stunning area in a confined runway or compartment, as shown most clearly in FIG. 6, so that all of the animals will be positioned in approximately the same fashion at the time that the stunning operation is performed.

In FIG. 8 I have shown a modified form of stunning device, having auxiliary prongs 50 in addition to the primary prongs. The auxiliary prongs 50 project inwardly and are more closely spaced together. These are adapted to be applied to the head forwardly of the base of the ears. The auxiliary prongs assure additional contact with the head during the stunning operation. In all other respects, the stunning device shown in FIG. 8 is the same as that shown in the first seven figures of the drawings.

Thus, it will be seen that I have provided an improved electrical stunning device which is of relatively simple and inexpensive construction; which is easy to manipulate and can be readily applied with certainty to the desired portion of the head of the animal; and which is so constructed that it can be safely operated without danger of shocking the operator.

Modifications may be made in the illustrated and described embodiments of my invention without departing from my invention as set forth in the accompanying claims.

I claim:

1. An electrical stunning device for stunning an animal prior to slaughtering comprising: an elongated tubular handle made of dielectric material and having first and second end portions and front and rear faces with the first end portion serving as a gripping area to be gripped by one hand of the operator and with an intermediate portion serving as another gripping area to be gripped by the second hand of the operator; a pair of electrodes made of an electrically conducting material mounted on said tubular handle and having prong-like portions projecting from the second end of the handle in diverging relationship and being curved towards the front of the handle and terminating in forwardly and outwardly facing ends spaced apart a distance sufficient to approximately span the area of the head between the base of the ears of the animal to be stunned; a control box with transformer means mounted therein with a pair of secondary coils, one serving as a source of relatively high voltage electric current and the other serving as a source of relatively low voltage electric current and having a relay with an electromagnet in the circuit of the low voltage secondary coil and a relay switch actuated by the electromagnet in the circuit of the high voltage secondary coil; electrical leads extending through the tubular handle and connected to the electrodes at the second end portion of the tubular handle and having means at the first end portion to connect the leads to the circuit of the relatively high voltage secondary coil so as to be controlled by the relay switch; and a control switch mounted on the rear face of the handle in the intermediate gripping area thereof and having leads for connecting it to the circuit of the low voltage secondary coil in series with the relay electromagnet, said control switch being spring biased so as normally to be maintained in open position so that when the operator grips the said intermediate gripping area to press the electrodes against the head of an animal to be stunned the control switch is closed to actuate the relay and energize the electrodes, and when the pressure is released the control switch is opened and the relay is deactivated and the electrodes deenergized.

2. An electrical stunning device for stunning an animal prior to slaughtering as set forth in claim 1 in which the control box is located outside of said tubular handle.

References Cited by the Examiner

UNITED STATES PATENTS

| | | | |
|---|---|---|---|
| 1,902,901 | 3/33 | Tefft | 17—1 |
| 2,977,627 | 4/61 | Morse et al. | 17—1 |
| 3,012,271 | 12/61 | Morse. | |
| 3,055,046 | 9/62 | Hlavacek et al. | 17—1 |
| 3,104,417 | 9/63 | Berry | 17—1 |
| 3,110,925 | 11/63 | McMath et al. | 17—1 |
| 3,152,357 | 10/64 | Wemmer | 17—1 |

SAMUEL KOREN, *Primary Examiner.*

LUCIE H. LAUDENSLAGER, *Examiner.*